(12) United States Patent
Adams

(10) Patent No.: US 6,195,767 B1
(45) Date of Patent: Feb. 27, 2001

(54) DATA CORRUPTION DETECTION APPARATUS AND METHOD

(76) Inventor: Phillip M. Adams, 1466 Chandler Dr., Salt Lake City, UT (US) 84103

(*) Notice: Subject to any disclaimer, the term of this patent is extended or adjusted under 35 U.S.C. 154(b) by 0 days.

(21) Appl. No.: 09/152,802

(22) Filed: Sep. 14, 1998

(51) Int. Cl.⁷ .............................. H02H 3/05; G06K 5/04
(52) U.S. Cl. ........................... 714/47; 714/48; 714/42; 714/43; 714/718
(58) Field of Search ............................. 714/47, 48, 42, 714/43, 718

(56) References Cited

U.S. PATENT DOCUMENTS

| | | | |
|---|---|---|---|
| 3,908,099 | 9/1975 | Borbas et al. | 179/175.2 |
| 4,942,606 | 7/1990 | Kaiser et al. | 380/4 |
| 4,996,690 | 2/1991 | George et al. | 371/37.1 |
| 5,093,910 | 3/1992 | Tulpule et al. | 395/575 |
| 5,210,860 | * 5/1993 | Pfeffes et al. | 395/575 |
| 5,212,795 | 5/1993 | Hendry | 395/725 |
| 5,233,692 | 8/1993 | Gajjar et al. | 395/325 |
| 5,237,567 | 8/1993 | Nay et al. | 370/85.1 |
| 5,379,414 | * 1/1995 | Adams | 395/575 |
| 5,416,782 | 5/1995 | Wells et al. | 371/21.2 |
| 5,422,892 | 6/1995 | Hii et al. | 371/24 |
| 5,619,642 | 4/1997 | Nielson et al. | 395/182.04 |
| 5,805,788 | * 9/1998 | Johnson | 395/182.04 |
| 5,844,911 | * 12/1998 | Schadess et al. | 371/10.2 |
| 5,983,002 | * 11/1999 | Adams | 395/183.18 |
| 6,115,199 | * 9/2000 | Bang | 360/51 |

OTHER PUBLICATIONS

NEC Electronics, Inc., "IBM–NEC Meeting for μPD765A/μPD72065 Problem" (U.S.A., May 1987). 6 pps.

Intel Corporation, Letter to customers from Jim Sleezer, Product Manager, regarding FDC error and possible solutions (U.S.A., May 2 1988).

Adams, Phillip M., Nova University, Department of Computer Science, "Hardware–Induced Data Virus," Technical Report TR–881101–1 (U.S.A., Nov. 14, 1988).

Advanced Military Computing, "Hardware Virus Threatens Databases," vol. 4, No. 25, pp. 1 & 8 (U.S.A., Dec. 5, 1988).

Intel Corporation, "8237A/8237A–4 /8237A–5 High Performance Programmable DMA Controller" (U.S.A., date unknown.).

Intel Corporation, "8272A Single/Double Density Floppy Disk Controller" (U.S.A., date unknown).

* cited by examiner

Primary Examiner—Norman M. Wright
(74) Attorney, Agent, or Firm—Pate Pieree & Baird (57) ABSTRACT

A system and method for providing detection of the signatures effected by a defective Floppy Diskette Controller ("FDC") operates on media independent of files thereon, or on files, independent of the media on which they are stored. Multiple testing strategies incorporate evaluations to detect signatures of data corruption introduced by defective FDCs from long transfer delays, short transfer delays, contiguous storage of logical sectors, or fragmented storage of logical sectors of a file. A false positive filter uses secondary testing of data. Filters remove from consideration those common patterns that properly and naturally occur. These filters rely on indicia demonstrating that primary leading indicators of the presence of an error do not really result from an actual error. The signatures may be detected regardless of subsequent transfer of corrupted files to various media including the media tested.

26 Claims, 7 Drawing Sheets

DATA CORRUPTION DETECTION APPARATUS AND METHOD

BACKGROUND

1. The Field of the Invention

This invention relates to the detection of corruption occurring in data written to storage media relying on a defective Floppy Diskette Controller ("FDC"), where an undetected data error causes data corruption and, more particularly, to novel systems and methods for inspection and warning to enable prompt restoration of data corrupted by defective FDCs.

2. The Background Art

Computers are now used to perform functions and maintain data critical to many organizations. Businesses use computers to maintain essential financial and other business data. Computers are also used by government to monitor, regulate, and even activate, national defense systems. Maintaining the integrity of the stored data is essential to the proper functioning of these computer systems, and data corruption can have serious (even life threatening) consequences.

Most of these computer systems include diskette drives for storing and retrieving data on floppy diskettes. For example, an employee of a large financial institution might have a personal computer that is attached to the main system. In order to avoid processing delays on the mainframe, the employee may routinely transfer data files from the host system to his local personal computer and then back again, temporarily storing data on a local floppy diskette. Similarly, an employee with a personal computer at home may occasionally decide to take work home, transporting data away from and back to the office on a floppy diskette.

Data transfer to and from a floppy diskette is controlled by a device called a Floppy Diskette Controller ("FDC"). The FDC is responsible for interfacing the computer's Central Processing Unit ("CPU") with the physical diskette drive. Significantly, since the diskette is spinning, it is necessary for the FDC to provide data to the diskette drive at a specified data rate. Otherwise, the data will be written to the wrong location on the diskette.

The design of the FDC accounts for situations when the data rate is not adequate to support the rotating diskette. Whenever this situation occurs, the FDC aborts the operation and signals the CPU that a data underrun condition has occurred. Unfortunately, however, it has been found that a design flaw in many FDCs makes it impossible to detect all data underrun conditions. This flaw has, for example, been found in the NEC 765, INTEL 8272 and compatible Floppy Diskette Controllers. Specifically, data loss and/or data corruption can occur during data transfers to or from diskettes (or even tape drives and other media which employ the FDC), whenever the last data byte of a sector being transferred is delayed for more than a few microseconds. Furthermore, if the last byte of a sector write operation is delayed too long then the next (physically adjacent) sector of the diskette will be destroyed as well.

For example, it has been found that these FDCs cannot detect a data underrun on the last byte of a diskette read or write operation. Consequently, if the FDC is preempted during a data transfer to the diskette (thereby delaying the transfer), and an underrun occurs on the last byte of a sector, the following occurs: (1) the underrun flag does not get set, (2) the last byte written to the diskette is made equal to the previous byte written, and (3) Cyclic Redundancy Check ("CRC") is generated on the altered data. The result is that incorrect data is written to the diskette and validated by the FDC.

Conditions under which this problem may occur can be identified by simply identifying those conditions that can delay data transfer to or from the diskette drive. In general, this requires that the computer system be engaged in "multi-tasking" operation or in overlapped input/output ("I/O") operation. Multi-tasking is the ability of a computer operating system to simulate the concurrent execution of multiple tasks. Importantly, concurrent execution is only "simulated" because there is usually only one CPU in today's personal computers, and it can only process one task at a time. Therefore, a system interrupt is used to rapidly switch between the multiple tasks, giving the overall appearance of concurrent execution.

MS-DOS and PC-DOS, for example, are single-task operating systems. Therefore, one could argue that the problem described above would not occur. However, there are a number of standard MS-DOS and PC-DOS operating environments that simulate multi-tasking and are susceptible to the problem. The following environments, for example, have been found to be prime candidates for data loss and/or data corruption due to defective FDCs: local area networks, 327x host connections, high density diskettes, control print screen operations, terminate and stay resident ("TSR") programs. The problem has also been found to occur as a result of virtually any interrupt service routine. Thus, unless the MS-DOS and PC-DOS operating systems disable all interrupts during diskette transfers, they are also susceptible to data loss and/or corruption.

The UNIX operating system is a multi-tasking operating system, and it is extremely simple to create a situation that can cause the problem within UNIX. One of the more simple examples is to begin a large transfer to the diskette and place that task in the background. After the transfer has begun then begin to process the contents of a very large file in a way that requires the use of a higher-priority Direct Memory Access ("DMA") channel than the floppy diskette controller's DMA channel, i.e., video updates, multi-media activity, etc. Video access forces the video buffer memory refresh logic on DMA channel 1, along with the video memory access, which preempts the FDC operations from occurring on DMA channel 2 (which is lower priority than DMA channel 1). This type of example creates the classic overlapped I/O environment and can force the FDC into an undetectable error condition. More rigorous examples could include the concurrent transfer of data to or from a network or tape drive using a high priority DMA channel while the diskette transfer is active. Clearly, the number of possible error producing examples is infinite and very possible in this environment.

For all practical purposes the OS/2 and newer Windows operating systems can be regarded as UNIX derivatives. In other words, they suffer from the same problems that UNIX does. There are, however, two significant differences between these operating systems and UNIX. First, they both semaphore video updates with diskette operations in an effort to avoid forcing the FDC problem to occur. However, any direct access to the video buffer, in either real or protected mode, during a diskette transfer will bypass this safe-guard and result in the same condition as UNIX. Second, OS/2 incorporates a unique command that attempts to avoid the FDC problem by reading back every sector that is written to the floppy diskette in order to verify that the operation completed successfully. This command is an extension to the MODE command (MODE DSKT VER= ON). With these changes, data loss and/or data corruption should occur less frequently than before, but it is still possible for the FDC problem to destroy data that is not related to the current sector operation.

There are a host of other operating systems that are susceptible to the FDC problem just like DOS, Windows, Windows 95, Windows NT, OS/2, and UNIX. However, these systems may not have an installed base as large as DOS, Windows, OS/2 or UNIX, and there may, therefore, be little emphasis on addressing the problem. Significantly, as long as the operating systems utilize the FDC and service system interrupts, the problem can manifest itself. This can, of course, occur in computer systems which use virtually any operating system.

Some in the computer industry have suggested that the FDC problem is extremely rare and difficult to reproduce. This is similar to the argument presented during the 1994 defective INTEL Pentium scenario. Error rates for the defective Pentium ranged from microseconds to tens-of-thousands of years! Admittedly, the FDC problem is often very difficult to detect during normal operation because of its random characteristics. The only way to visibly detect this problem is to have the FDC corrupt data that is critical to the operation at hand. There may, however, be many locations on the diskette that have been corrupted, but not accessed. Studies have recently demonstrated that the FDC problem is quite easy to reproduce and may be more common than heretofore believed.

Computer users may, in fact, experience this problem frequently and not even know about it. After formatting a diskette, for example, the system may inform the user that the diskette is bad, although the user finds that if the operation is performed again on the same diskette everything is fine. Similarly, a copied file may be unusable, and the computer user concludes that he or she just did something wrong. For many in this high-tech world, it is very difficult to believe that the machine is in error and not themselves. It remains a fact, however, that full diskette back-ups are seldom restored, that all instructions in programs are seldom, if ever, executed, that diskette files seldom utilize all of the allocated space, and that less complex systems are less likely to exhibit the problem.

Additionally, the first of these FDCs were shipped in the late 70's. The devices were primarily used at that time in special-purpose operations in which the FDC problem would not normally be manifest. Today, on the other hand, the FDCs are incorporated into general-purpose computer systems that are capable of concurrent operation (multi-tasking or overlapped I/O). Thus, it is within today's environments that the problem is most likely to occur by having one of the operations delay the data transfer to the diskette. The more complex the computer system, the more likely it is to have one activity delay another, thereby creating the FDC error condition.

In short, the potential for data loss and/or data corruption is present in all computer systems that utilize the defective version of this type of FDC, presently estimated at about 25 million personal computers. The identification and repair of defective FDCs has been described in previously filed U. S. patent applications.

In addition to a solution to the FDC problem it is necessary to be able to accurately, and correctly, identify defective, corrupted data before that data is relied upon at great loss. The design flaw in the FDC causes data corruption to occur and manifest itself in the same manner as a destructive computer virus. Furthermore, because of its nature, this problem has the potential of rendering even secure databases absolutely useless.

The defect in FDCs, however, results in various types of corruption having different signatures, according to the nature of the defective FDC and the nature of the conditions at transfer. Moreover, files may be transferred, fragmented, defragmented, and the like many times over years. Thus, corruption may be spread and the corrupted files relied upon at any time. Locating the possibility or probability of corruption in an individual file or a sector of storage media is a first step toward restoring reliable information before corruption can cause serious harm.

The aforementioned delay (long or short) in a transfer of a last data byte of a sector either to or from a floppy diskette at any time in the history of a file, may cause corruption. The length of the transfer delay may alter the nature of the corruption which corruption may then be copied or transferred any number of times before being relied upon.

Files may also be fragmented or defragmented. Accordingly, a logical file may be written to contiguous or non-contiguous sectors of any particular medium. Transfers, fragmentation, de-fragmentation, and the like may occur long after an initial occurrence of corruption, further obscuring the more obvious signatures of corruption.

Thus, an apparatus and method are needed to detect the possibility of corruption from either long or short delays in transfers controlled by defective FDCs. File integrity must be tested regardless of fragmentation (non-contiguity) of sectors holding logically consecutive data. Integrity must be testable whether subsequent transfers have occurred by any means which may or may not have affected logical or physical contiguity of sectors' contents.

BRIEF SUMMARY AND OBJECTS OF THE INVENTION

In view of the foregoing, it is a primary object of the present invention to provide a system and method for the detection of data corruption due to defective Floppy Diskette Controllers ("FDCs").

It is also an object of the present invention to provide an automated software-only (programmatic) approach to reduce the labor of searching files and media.

Consistent with the foregoing objects, and in accordance with the invention as embodied and broadly described herein, a system and method are disclosed in one embodiment of the present invention as including a detection program that is capable of correctly and accurately detecting the signature of data corruption associated with defective FDCs.

The approach taken includes testing according to physical media configuration, and according to logical file configuration. The tests report the presence of any of the signatures known to be associated with defective FDCs. The system manager or other responsible party can then restore the files from an uncorrupted archival copy, if available. In any event, A warning may thus be available to identify individual files as well as sectors of media that are not reliable.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
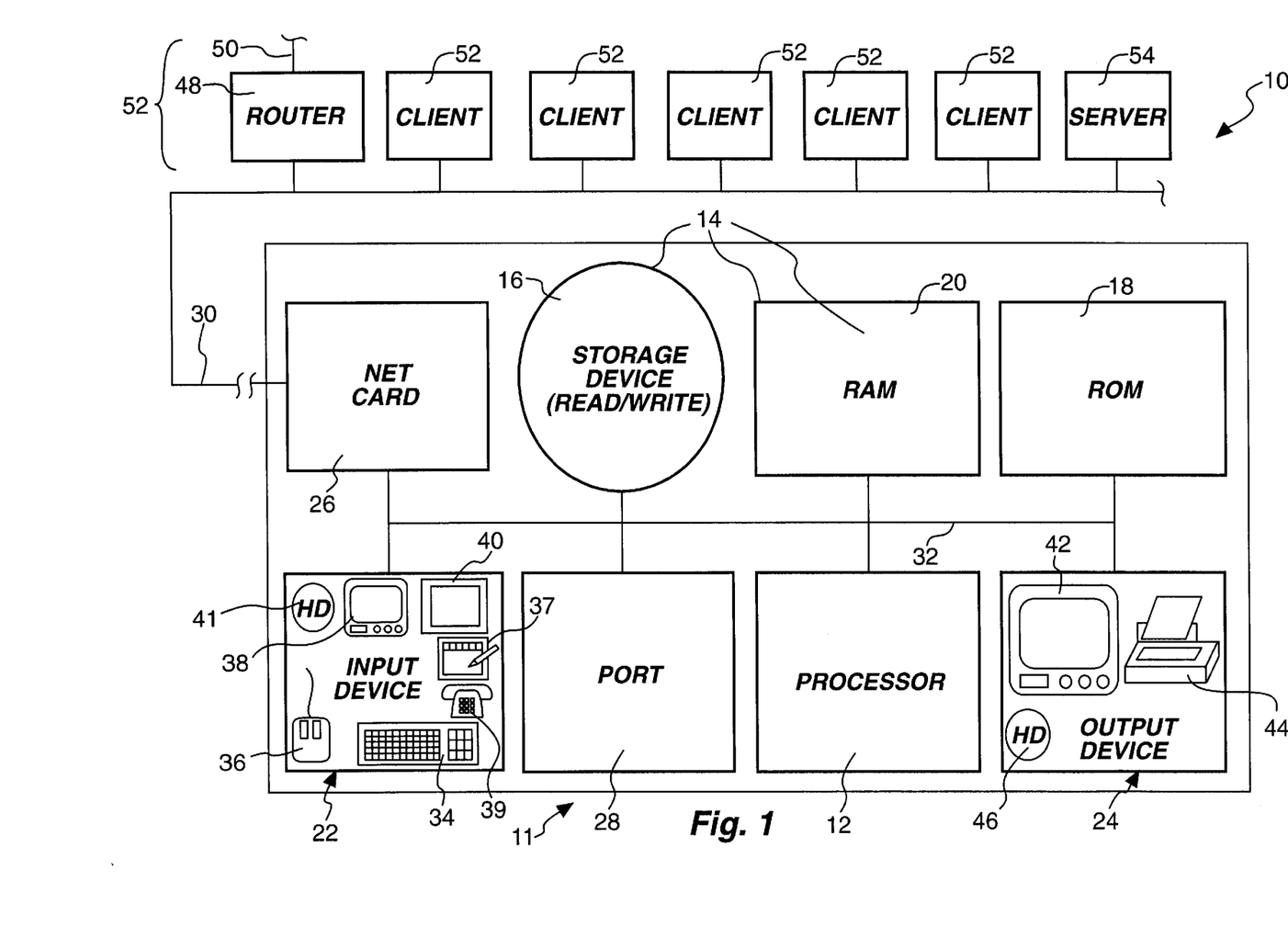
FIG. 1 is a schematic block diagram of a system consistent with a computer hosting executables and data to implement the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM) and a random access (and usually volatile) memory 20 (RAM/operational memory).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 (e.g., 52a, 52b, etc.) on the network 30, or from another network 50.

Output devices 24 may likewise include one or more physical hardware units. For example, in general, the port 28 maybe used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
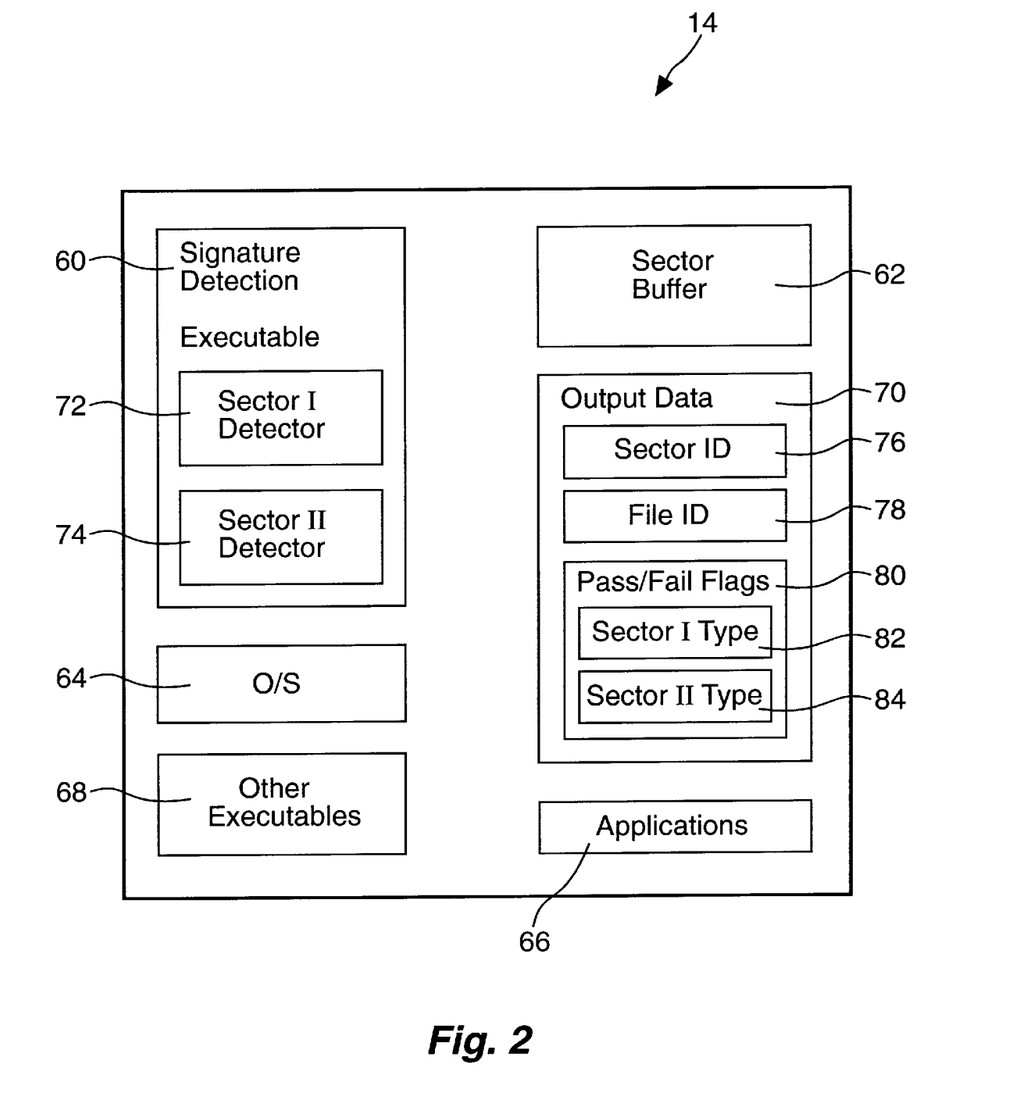
FIG. 2 is a schematic block diagram of data structures containing executables and operational data for implementing an embodiment of the invention on the apparatus of FIG. 1.

Referring to FIG. 2, a storage device 14, may be loaded with executables and data. For execution, of the storage device 14 may be the RAM 20. For initial installation, the memory device 14 selected may be another storage device 16 or ROM 18. In general, executables and operational data ready to be executed by a processor 12 may implemented in a memory device 14 corresponding to RAM 20.

A signature detection executable 60 may contain instructions in suitable code for implementing algorithms. The signature detection executable 60 may operate with sector buffer 62. The sector buffer 62 is sized to store data select for evaluation. Evaluation, conducted by the signature detection executable 60 includes analysis of the contents of data stored on media to be tested. In one embodiment, the sector buffer 62 may include one or more buffers 62. Alternatively, the sector buffer 62 may include sufficient space to hold at least two complete sectors from a storage medium to be tested.

A processor 12 requires some underlying operating system 64 in order to run the executable 60. Similarly, applications 66 and other executables 68 may be hosted in the memory device 14. In one presently preferred embodiment, the memory device 14 is the random access memory (RAM) 20 of FIG. 1.

Output data 70 may be stored during operation of the signature detection executable 60 on the processor 12. The output data 70 indicates the nature of any corruption signature found by the signature detection executable 60.

The signature detection executable 60 may include detector 72 for distinguishing corruption peculiar to a primary, leading, or first sector. A detector 74 may be programmed to identify corruption normally associated with a following, secondary, or second sector involved in corruption by defective floppy diskette controller (FDC). Each of the detectors 72, 74 may be programmed to operate on a logical basis or physical basis. That is, in one embodiment, an apparatus and method in accordance with the invention may operate based on files. Accordingly, the file system associated with a computer 11 may be relied upon to define the location of an initial sector, subsequent sectors, and a final sector associated with a single file at a time. Thus, regardless of the random nature of storage on any storage device 14, a file may be tested for integrity.

Similarly, a detector 72, 74 may be programmed to operate on any particular storage medium 16, 18, 20. For example, a storage device 16 may be a floppy diskette or a hard drive. The ROM 18 may be configured in a chip, or on a laser-readable compact disk. In certain embodiments, the detectors 72, 74 may scan and evaluate the entire medium within a particular memory device 14. Thus, any physical sectors containing the signature identified with corruption by a defective floppy diskette controller may be detected, regardless of subsequent transfer to any other storage device 14. Since storage is typically done on a sector basis, corrupted sectors may be detected over an entire storage medium, or over a particular file on a storage medium.

The output data 70 may include any information deemed suitable to enable ready identification of files, responsible individuals, and the like. Perhaps most importantly, the output data 70 may include information identifying files, and personnel responsible for those files, in order to enable prompt restoration of corrupted files.

In one embodiment, the output data 70 may include sector identification 76. Sector identification 76 (sector ID 76) may include not only a sector number, but a volume number, a network address of a computer 11 on which the defective sector is located, and the like. Thus, an entire path may identify a sector by any path or context required.

A file identifier 78 (file ID 78) may identify a particular file in which corruption is detected. A file system will typically contain a file name as well as higher level path identification associated with a user, computer 11, volume, directory, and the like. A file identifier 78 may include any information deemed suitable to rapidly and effectively single out a file containing corruption. Likewise, sufficient context may be provided in the file ID 78 to enable a user to locate a source of such corrupted file. Accordingly, a user, system manager, or other responsible party may be able to more rapidly identify a source file from which a corrupted file may be restored. Likewise, a source file may be corrupted. Accordingly, identification of a file with sufficient detail to identify its source may provide identification of other storage media to be tested for corruption.

In one embodiment, pass fail flags 80 may be included as output data 70. For example, in one embodiment, every sector in a storage medium may be identified as passing or failing a test in accordance with the invention. Similarly, every file in a volume or a server may be tested and identified as having passed or failed a test in accordance with the invention. However, in one currently preferred embodiment of an apparatus and method in accordance with the invention, only sectors of a medium or a file displaying a corruption signature need be identified. Thus, the nature of such corruption signature may be identified. For example, corruption occurs in a primary sector due to improper writing and error checking by a defective floppy diskette controller. Depending on the length of a delay, the corruption may extend to a subsequent sector. Thus, a sector I type flag 82 may identify a sector as containing corruption on the type identified by a sector I detector 72. Similarly, a sector II type flag 84 may identify a sector as containing corruption having the signature detected by the sector II detector 74.

Figure 3:
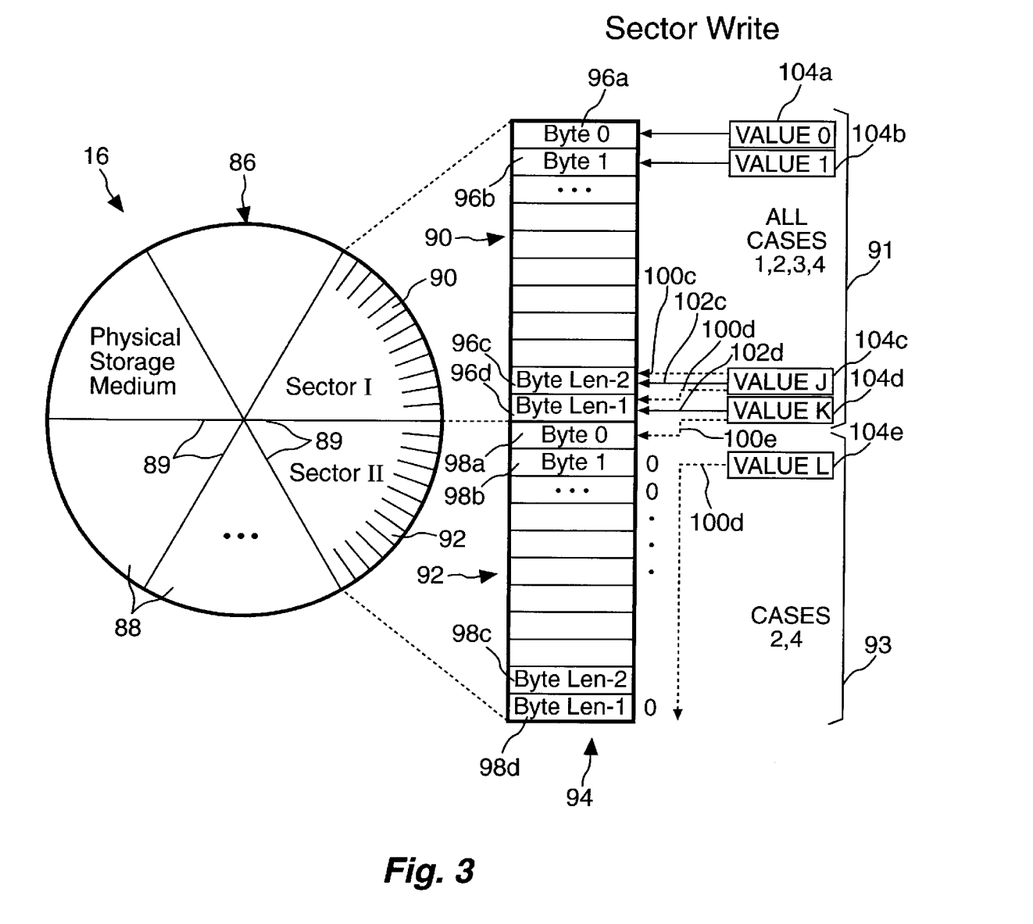
FIG. 3 is a schematic block diagram illustrating a physical view of data storage on a sectored storage medium.

Referring to FIG. 3, specifically, and to FIGS. 2–5, generally, a storage device 16 may include a storage medium 86. The storage medium 86 may contain one or more disks or diskettes. In general, data corruption may be initiated by a defective floppy diskette controller on a particular diskette. However, in general, a file or sector thus corrupted may be copied to any other memory device 14. Thus, a storage device 16 being tested for corruption may be a diskette, a hard disk, or other storage device 14 to which data may have been transferred subsequent to storage on a floppy diskette.

The storage medium 86 may contain sectors 88, subdivisions 88 into which medium 86 may be subdivided for purposes of addressing and segmenting data. The sectors 88 may be separated by sector boundaries 89 specified in a formatting standard used to format the storage medium 86. For convenience, a sector I 90 and sector II 92 are identified. Each of the sectors 90, 92 may be physically represented by a map 94 of individual bytes. The number of bytes in a particular sector 90, 92 is established by an appropriate standard. Thus, a first byte 96a in sector I 90 has a number of zero. The second byte 96b is identified as byte one. Thus, a last byte 96d is a byte identified by the length of the sector 90, less one. Likewise, the next-to-last byte 96c is counted according to a length, less two, of the sector 90. In sector II 92, a first byte 98a, second byte 98b, next-to-last byte 98c, and last byte 98d, may be thought of as similarly numbered.

In FIG. 3, the paths 100 illustrate the effect of a defective floppy diskette controller, under corrupting conditions. The paths 102 illustrate the paths that particular bytes 96, 98 should take in a non-defective floppy diskette controller, or in a defective floppy diskette controller under non-corrupting conditions.

Various values 104 may be placed in the byte locations 96, 98 in the sectors 90, 92, respectively. For example, a value zero 104a is stored to the byte zero location 96a. A value one 104b is stored to the byte one location 96b.

In normal operation, a value J 104c is stored at the next-to-last byte location 96c, while a value K 104d is stored to a last byte location 96d. Sector II 92 should remain unaffected by the transfer of values 104 to sector I 90.

In all cases of data corruption due to defective FDC's, the value J 104c intended for the next-to-last byte location 96c is stored at the proper location 96c. Thus, the intended path 102c for normal operation is duplicated by the path 100c when corruption is incipient.

However, the value J 104c in the presence of the corrupting conditions for a defective FDC, is transferred along the path 100d to the last byte location 96d. Normally, the value K 104d that would be transferred along the path 102d to a last byte location 96d is detoured.

The value K 104d passes along the path 100e to the first byte location 98a in sector II 92. Thus, the last byte location 96d contains the same value J 104c that is written to the next-to-last byte location 96c. Meanwhile, a value L 104e, having an actual numerical value of zero, is written to all other byte locations 98b, 98c, 98d up to the last byte location 98e of sector II 92.

One fundamental cause of corruption is delay in writing a value K 104d to a last byte location 96d. If the delay is greater than a single byte write time (32 μs or 16 μs) and less than 80 microseconds, the delay is considered to be a "short delay." If the delay is greater than 80 microseconds, then a "long delay" has occurred. If a short delay occurs, then the value K 104d is not written to the last byte location 96d, nor anywhere else. However, if the delay is long, then sector II 92 will be effected.

Figure 4:
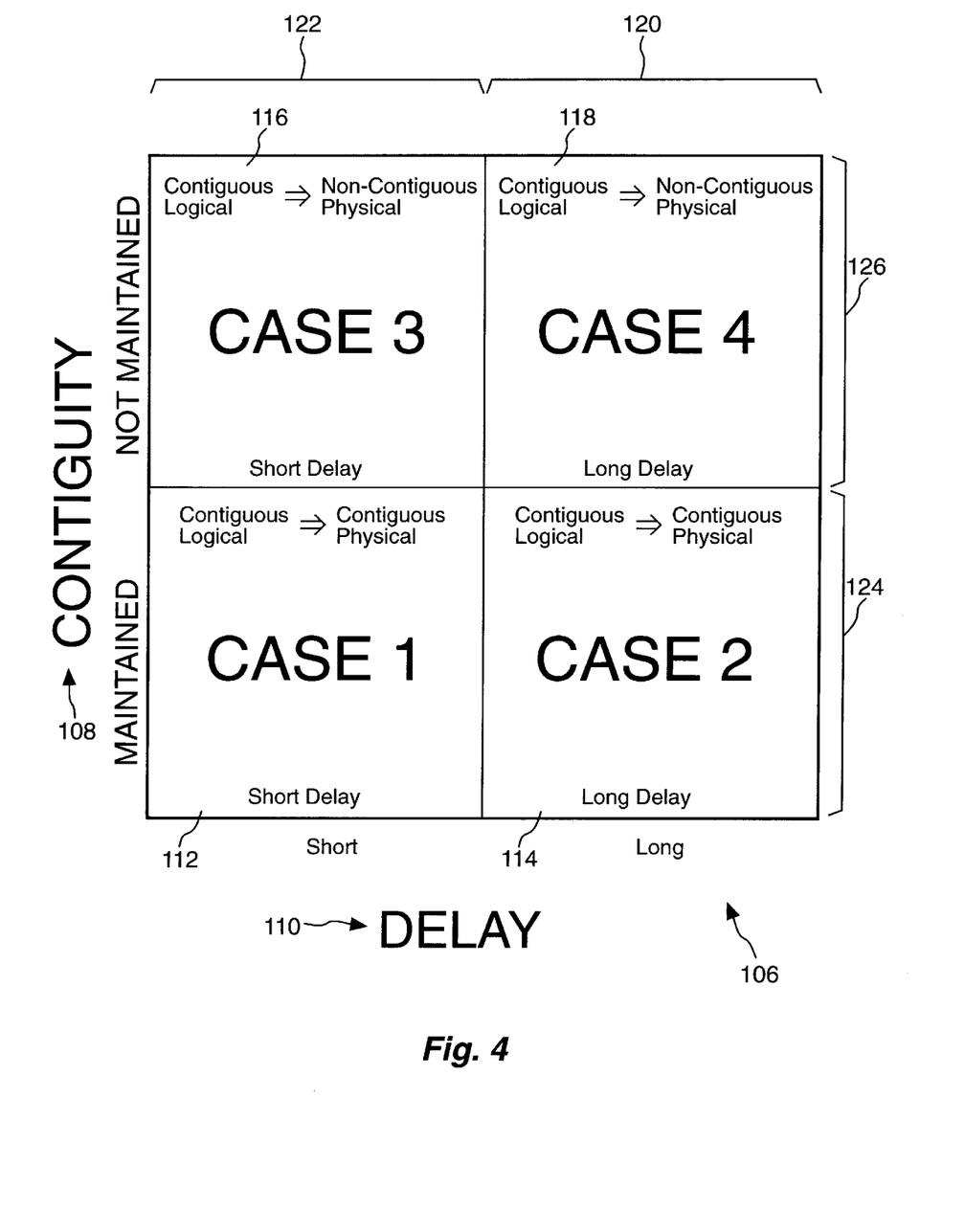
FIG. 4 is a schematic block diagram illustrating the combinations of conditions that may create corruption detectable by an apparatus and method in accordance with the invention.

The mapping of values 104 to byte locations 94 in FIG. 3, in accordance with the normal paths 102 and the corruption paths 100 varies according to certain conditions or cases. FIG. 4 illustrates the conditions and cases that various scenarios may present with a defective floppy diskette controller.

Referring to FIG. 4, a matrix 106 relates a contiguity 108 and delay 110 to create various cases 112, 114, 116, 118. Contiguity 108 refers to whether or not a file has been fragmented or defragmented. For example, a file has a logical flow. Nevertheless, the data corresponding to a particular file may be stored in randomly distributed sectors 88 within a storage medium 86. Contiguity of adjacent sectors 90, 92 may maintained. Alternatively, contiguity 108 may also not be maintained. Similarly, a delay greater than 80 microseconds is considered a long delay 120. A delay of less 80 microseconds is considered a short delay 122. As discussed above, the corruption signature varies according to whether or not the delay 110 in a transfer of the values 104 to a sector 88 is controlled according to the length of the delay 110.

Case 1 corresponds to a short delay 122 in transferring values 104 to byte locations 96. In case 1 112 also corresponds to maintained contiguity 124. Contiguity 108 may be maintained 124 or not maintained 126. FIG. 4 illustrates maintenance 124 and non-maintenance 126 of contiguity 108. Contiguity 108 refers to the writing of logically contiguous data onto physically contiguous sectors 90, 92.

Case 1 112 has conditions of a short delay 122 and maintained contiguity 124. Since the delay 110 is short 122, only a sector I 90 is affected.

Case 2 114 has conditions corresponding to a long delay 120 and maintained contiguity 124. Since case 2 114 includes a long delay 120, corruption may occur in both sector I 90, and sector II 92 of the same logical file unless sector I 90 is the last sector of the file thus causing corruption in logically unrelated locations.

Case 3 116 has conditions corresponding to a short delay 122 and non-maintained contiguity 126. Because the delay 110 is short 122, case 3 116 may result in corruption only in sector I 90. Sector II 92 remains unaffected.

Case 4 118 includes corresponding conditions of a long delay 120 and non-contiguity 126. The long delay 120 can cause corruption to occur in both sector I 90 and sector II 92. Sector II 92 is not logically related to sector I 90 potentially causing data corruption to another (unrelated) file. One may note that the delay 110, whether long 120 or short 122, appears to control the presence of corruption in sector II 92. Contiguity 108 does not appear to be a factor in the nature of the corruption.

Contiguity 108 or maintenance 124 and non-maintenance 126 of contiguity 108 does not control the presence of corruption, but rather the signature thereof. Thus, FIGS. 3–5 should be viewed together.

Figure 5:
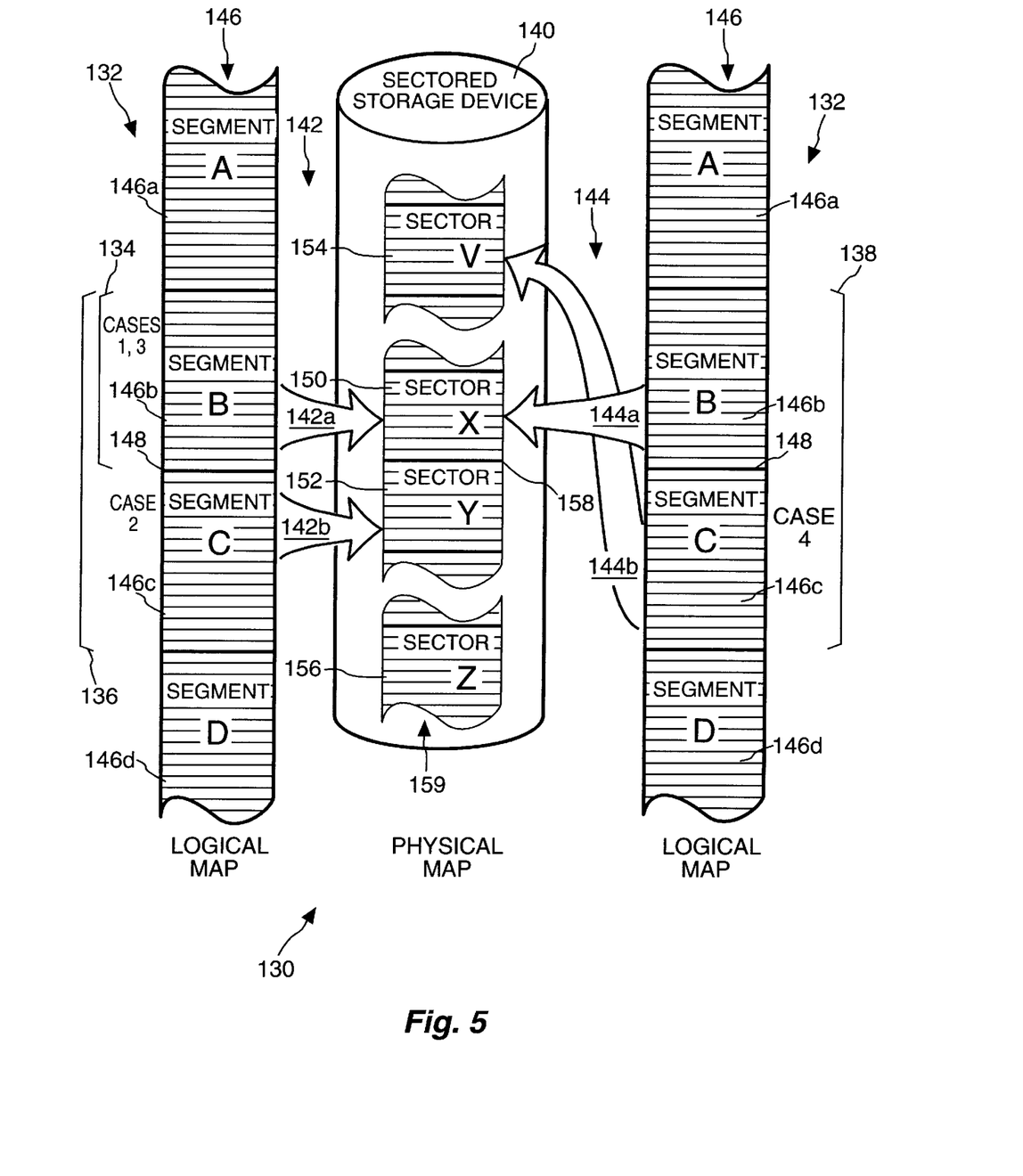
FIG. 5 is a schematic block diagram of a sectored storage device and its relationship to logical maps of files that may be stored thereon before or after corruption of sectors.

Referring to FIG. 5, a map 130 of the file 132 is illustrated under various sets 134, 136, 138 of conditions, or simply under scenarios 134, 136, 138 or conditions 134, 136, 138. The set 134 corresponds to conditions of case 1 112 and case 3 116. The conditions 136 or set 136 of conditions, corresponds to case 2 114 in FIG. 4. The set 138 of conditions, or condition 138 corresponds to case 4 118 in FIG. 4. The conditions 134 or set 134 corresponds to a short delay 122, and thus a short delay corruption signature 91 or sector I corruption 91. The case 136 or set 136 corresponds to sector II corruption 93 or long delay corruption 93 with maintained contiguity 124 between a logical map 132 and a physical map 140. Meanwhile, the conditions 138 or set 138 corresponds to long delay corruption 93 or sector II corruption 93 corresponding to a long delay 120 wherein contiguity 108 is not maintained 126.

A storage device 140 is sectored to receive data. Data may be transferred 142 continually (maintaining contiguity 124). Data may also be transferred from 144 with contiguity 108 not maintained 126. Note that trailing alphabetical characters after reference numerals merely identify instances of the principle or generic feature identified by the reference numeral.

For example, a file 132 may be divided into segments 146. The segments 146a, 146b, 146c, 146d are illustrated in a sequential, logical, and contiguous arrangement. Segments 146 may correspond to sector-sized portions of a file 132 or logical map 132 of data or code. The individual segments 146 may be thought of as being divided at segment boundaries 148.

Similarly, the storage device 140 may be sectored into individual sectors 150, 152, 154, 156, separated by sector boundaries 158. The sectors may also be referred to generically as sectors 159, or as a sector 159. Notice that sectors 150, 152 are illustrated schematically as being contiguous. Sectors 154, 156 may be separated from the sectors 150, 152 by some other number of individual sectors 159.

Under the set 134 of conditions, a segment 146b may be transferred 142a to a sector 150. Under the conditions 134, corresponding to case 1 112 and case 3 116, said transfer 142a does not affect the subsequent segment 146c, nor the subsequent sector 152. Rather the transfer 142b occurs without an influence of the corruption that may be included in a transfer 142a. This condition corresponds to a short delay 122. Thus, a corruption signature in the sector 150 will include a value J 104c in a next-to-last byte location 96c in the sector 150. Likewise, a value J 100d will be stored in the last byte location 96d of sector 150 (see FIG. 3). Because the delay 110 is a short delay 122, the value K 104d that should have been transferred along the path 102d to the last byte location 96d is simply lost. The value K 104d is not written to the subsequent sector 152 along the path 100e. The conditions 136 corresponding to case 2 114, include the conditions 134 of case 1 112 and case 3 116. That is, sector I corruption occurs in the transfer 142a of the contents of a segment 146b to a sector 150. The distinction of sector 150 and segment 146b is used for convenience, to distinguish a logical file 132 from a physical image or map in a storage device 140. Nevertheless, each of the segments 146 may be expected to be of the same size as an individual sector 159.

In addition to the sector I corruption of the last byte location 96d in the sector 150, the conditions 136 cause sector II corruption. Thus, the contents of the segment 146c, when transferred 142b to the sector 152 of the storage device 140, demonstrate sector II corruption as illustrated in FIG. 3. The sector I corruption 91 affects the last byte location 96d of the sector 150. The sector II corruption 93 caused by the transfer 142a to the sector 150 damages all of the contents of the sector 152. As illustrated in FIG. 3, the first byte location 98a of the sector 152 receives, along the path 100e the spurious value K 104d. The value K 104d should have been written to the last byte location 96d of the sector 150. The additional characteristic of the sector II corruption 93 (long delay corruption 93, as opposed to the short delay corruption 91) is the placement of a value of zero as the value L 104e in all the remaining byte locations 98 between the second byte 94b and the last byte 98d in the sector 152. Thus, a signature for the conditions 134 of case 1 112 and case 3 116 is the presence of the same exact value J 104c in the next-to-last byte location 96c and the last byte location 96d in the sector 150. The additional signature available for case 2 114 unto the conditions 136, is the presence of a value K 104d in the first byte location 98a of the sector 152. The value K 104d is the value from the last byte location 96d of the segment 146b in the original logical file 132. Thus, two signature features may be identified in the sectors 150, 152 indicating corruption in the transfers 142a, 142b.

In the conditions 138 or set 138, long delay corruption 93 is present in the transfers 144a, 144b of the segments 146b 146c to respective, non-contiguous sectors 150, 154. Accordingly, the last byte location 96d of the sector 150 will contain a value J 104c identical to that stored in the next-to-last byte location 96c of the sector 150. However, since the segment 146 is written to a non-contiguous sector 154, the long-delay corruption 93 is not present in the sector 152 subsequent to the sector 150. Rather, a sector 154 randomly separated from the sector 150 contains the long-delay corruption 93. Thus, case 4 118 may exist virtually anywhere in a storage device 140.

In general, a file format managed by an operating system 64 writing to a storage device 140 controls the fragmentation of a file 132. Periodically, defragmentation may occur. In defragmentation, the information corresponding to contiguous segments 146b, 146c may be rewritten to contiguous sectors 150, 152 in the storage device 140. Note that the long-delay corruption 93 may occur in different ways.

For example, the contents of a segment 146b may be written to a sector 150 contiguously with a transfer of the segment 146c to the sector 152. The long-delay corruption 93 may occur in the following sector 152. Subsequently, the transfer 144b may copy the segment 146c to a sector 154.

Alternatively, the sector 150 may initially receive the contents of the segment 146b subject to short-delay corruption 91 (in a long-delay case, short-delay corruption 91 also exists), while a designated, subsequent sector 154 receives the corrupted contents of sector II corruption 93. The contents of the segment 146c may be stored as corruption in the sector 154. Alternatively, the contents of the segment 146c may be stored properly in the sector 154, with an intermediate sector 152 containing the corrupted sector II the sector 150 containing sector I corruption 91 and 93 contents.

Figure 6:
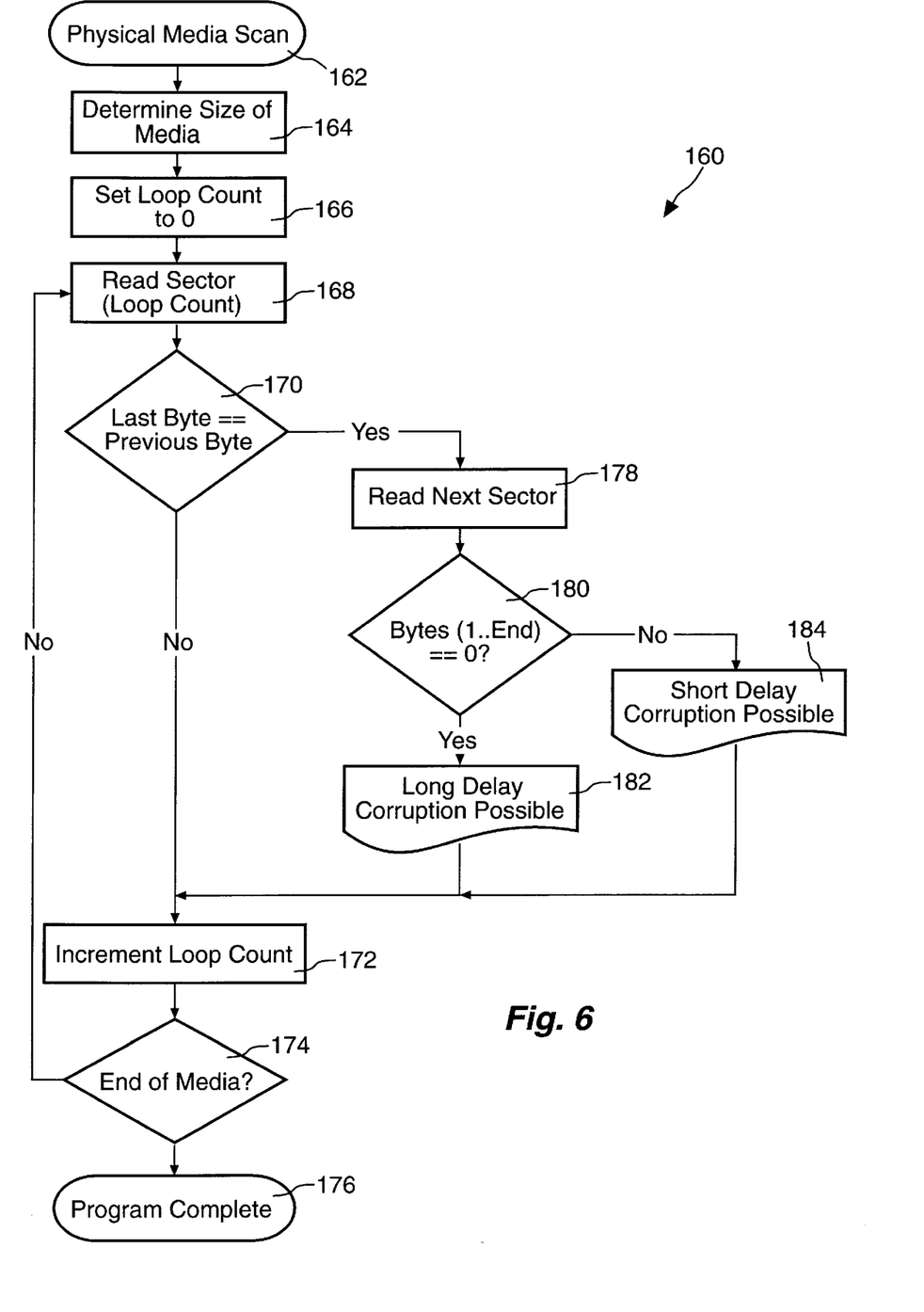
FIG. 6 is a schematic block diagram illustrating a method for detecting corruption by scanning physical storage media.

Referring to FIG. 6, a method 160 or process 160 is illustrated schematically for detecting corruption in a storage device 140 (see FIG. 5). The process 160 may be thought of as a physical media scan 162. Alternatively, one may think of a call 162 executed to run the process 160 of scanning the physical media 86 (see FIG. 3).

Upon a call 162, a size step 164 determines the total size of the media 86 in a storage device 140 to be tested. An initialize step 166 may set a counter to a value of zero for looping in accordance therewith.

A read step 162 may read an individual sector 88 of the media 86 in order, according to the counter 166. Thus, the count 166 begins at zero and progresses through all sectors 88, 159, in order. A test 170 reads the last two byte locations 96c, 96d in each sector 88, 159. The test 170 determines whether the contents of the last byte location 96d are exactly equal to the contents of the next-to-last byte location 96c. A negative response to the test 170 indicates an inequality between the byte locations 96c, 96d. The sector I corruption 91, or sector I corruption signature 91 is not present. Therefore, an increment step 172 increments the counter 166. Note that a step 166 of initializing a count or creating a count loop may also be referred to as the loop or as the count itself.

If the increment 172 added to the count 166 exceeds the total number of sectors 88 in the media 86, the test 174 will detect the end of the media 86. A negative response to the test 174 returns the process 160 to read 168 the next, incremented sector 88 identified. A positive response to the test 174 indicates that the media 86 is completely tested, and results in a termination 176 or return 176 of the process 160. The process 160 may operate as a standalone routine. Alternatively, the process 160 may be incorporated into other applications, such as a standard virus or corruption scanning program that searches for other types of signatures.

A positive response to the test 170 indicates that the short-delay corruption 91 appears to be present. Accordingly, a subsequent read step 178 reads the next sector 88 (e.g. sector 92, with respect to initial sector 90). A test 180 determines whether all of the byte locations 98, from the second byte location 98b (byte 1) through the last byte location 98d have a value of zero. A positive response to the test 180 indicates that long delay corruption 93 is possible. The output 182 indicates this possibility. It is also possible that the value of zero is properly written to the sector 92. Thus, the output 182 does not necessarily indicate absolutely that long-delayed corruption 93 is present.

A negative response to the test 180 indicates that the byte locations from the second byte 98b to the last byte 98d are not all filled with a value of zero. Thus, long-delay corruption 93 does not appear to be present. Accordingly, an output 184 indicates the possibility of short-delaying corruption 91. After the output 182, 184, the process 160 advances by incrementing 172 the count 166 and continuing to the end of the medial 86.

Figure 7:
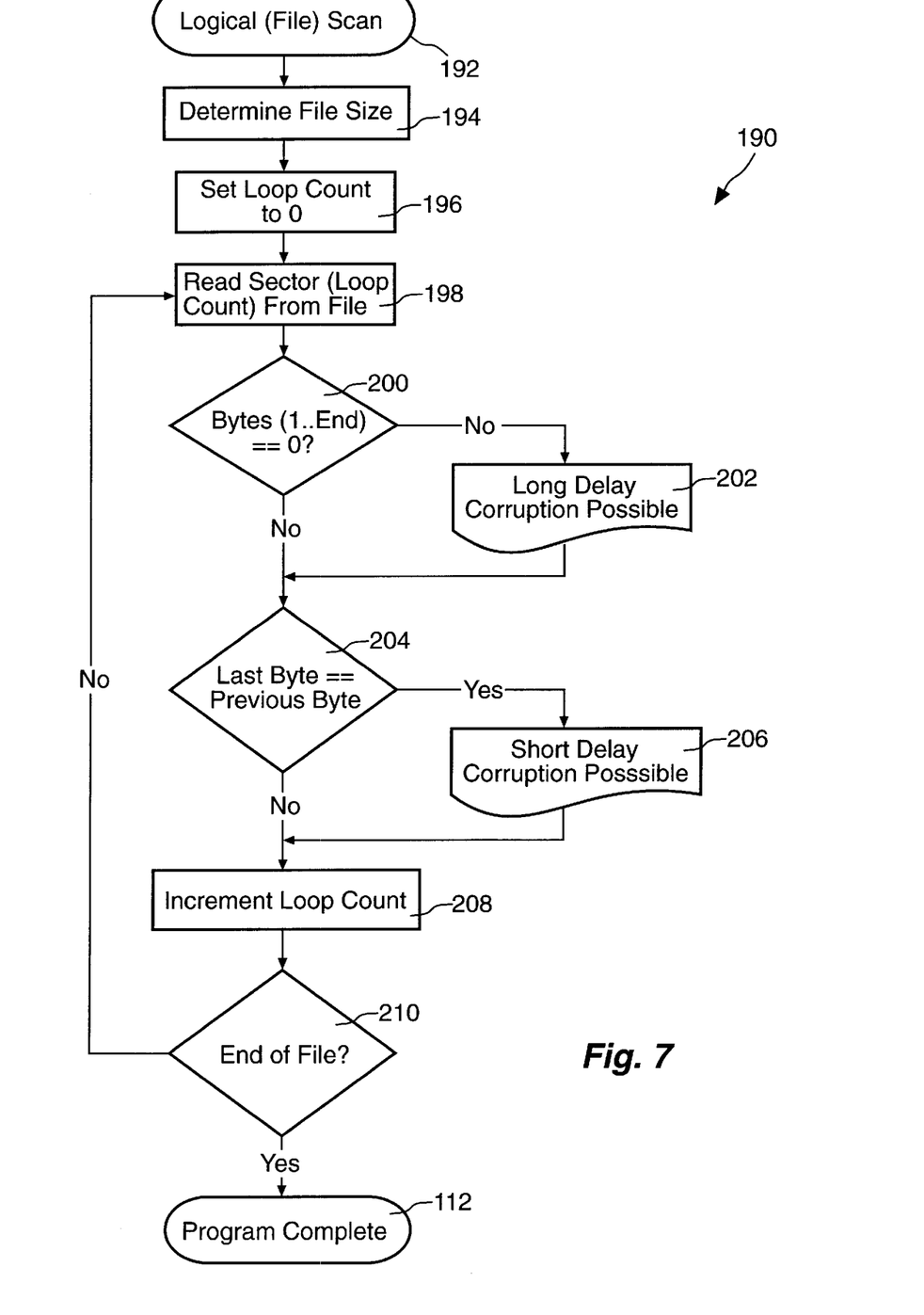
FIG. 7 is a schematic block diagram of a method for detecting corruption caused by defective floppy diskette controllers by scanning files according to logical structure.

Referring to FIG. 7, a process 190 provides a valuation of a logical file 132. That is, the process 160 operates on a storage device 140, and particularly on the storage medium 86 or media 86, regardless of the nature or content of individual files 132 stored thereon. By contrast, the process 190 scans the logical files 132 in the sequence of their respective segments 146, regardless of the nature of contiguous transfers 142 or non-contiguous transfers 144.

The logical scan 192, or the call 192 of a logical scan process 190, initiates a size step 194. The size step 194 determines the size of a particular file 132 stored in a storage device 140 (see FIG. 5). By determining 194 the size of the file 132, the process 190 can determine the sector-size segments 146, with their respective boundaries 148.

A loop 196, or an initialize 196 may set a loop count to an initial value of zero. Such iterative processes may be implemented in a variety of ways. An initialize step 196 is one currently preferred, and simple, method. Subsequently, a read step 198 reads the segment 146 corresponding to the current count 196. As discussed previously, the segments 146 each correspond to a sector. Nevertheless, in order to distinguish a logical sector 146 in a file 132, the sectors 146 are referred to as segments 146. Thus, a read 198 reads the logical sector 146 (segment 146) corresponding to the current count 196.

Thereafter, a test 200 determines whether the values stored in the byte locations 98 from the second byte location 98b to the last byte location 98d are all zero. A positive response to the test 200 indicates that long-delay corruption 93 is possible. Accordingly, an output 202 provides this feedback from the test 200.

A negative response to the test 200 indicates that the contents of the byte locations 98b through 98d do not all have a value of zero. Accordingly, a test 204 follows the test 200. The test 204 determines whether the last byte location 96d in a sector 88 of interest, has a value identical to that of a next-to-last byte location 96c. A positive response to the test 204 indicates that short-delay corruption 91 is possible. Thus, an output 206 is provided in response to the test 204. The output 206 indicates the possibility of short-delay corruption 91, whether or not the long-delay corruption 93 might also be present according to the output 202.

Regardless of the outputs 202, 206, a subsequent increment step 208 increments the count 196 or loop 196 to advance the tests 200, 204 to the next sector number available. If the number of the next count 196 is greater than the total size 194 determined by the size step 194, then the test 210 so detects. That is, the test 210 determines whether the end of the file 132 has been read 198. A negative response to the test 210 returns the process 190 to read 198 the next available sector 146 in the file 132. Note that in each case, a segment 146 or sector 146 in the logical file 132 will still correspond to some particular sector 159 on a storage device 140. Thus, a sector 88 of some physical medium 86 must always be read for the contents of any individual segment 146 (sector 146 logically). However, tapes, hard drives, volatile or other random access memory 20 may also be tested, and need not be arranged by the sector scheme or other physical media 86.

A positive response to the test 210 results in a return 212 or a completion 212 of the process 190. Accordingly, the outputs 202, 206 may be provided in written, numerical, automated statistical, or other formats. Alternatively, the return 212 may result in automatic correction of the corruption 91, 93 in certain instances.

Wherefore, I claim:

1. An apparatus for detecting data corruption resulting from defective operation of a floppy diskette controller, the method comprising:
a storage medium containing data disposed in a series of bytes;
a processor operably connected to the storage medium and programmed to execute a signature detection module, the signature detection module being effective to detect improper storage of the bytes, wherein the improper storage results from an error of a type causing erroneous replication of a byte in a sector of a storage medium;
a memory device operably connected to the processor for storing the signature detecting module.

2. The apparatus of claim 1, wherein the memory device stores a filter module for filtering out false positive results, and wherein a false positive result erroneously reflects a replication of bytes properly stored.

3. The apparatus of claim 1, wherein the storage medium contains data reflecting erroneous replication of bytes undetected at a time corresponding to a first writing.

4. The apparatus of claim 3, wherein the erroneous replication remains undetected during at least one subsequent writing after the time of the first writing.

5. The apparatus of claim 4, wherein the at least one subsequent writing reflects a change in type of the storage medium.

6. The apparatus of claim 5, wherein the time of first writing is comparatively distant from a time corresponding to the subsequent writing.

7. The apparatus of claim 6, wherein the comparative distance between the first writing and the subsequent writing reflects a loss of identifying data for detecting the error, the loss occurring after the time of first writing.

8. The apparatus of claim 4, wherein the time of first writing occurs during a write operation to a magnetic medium.

9. The apparatus of claim 8, wherein the magnetic medium is a floppy diskette.

10. The apparatus of claim 1, wherein the storage medium is configured in a computer-readable data storage device.

11. The apparatus of claim 1, wherein the storage medium is selected from the group consisting of magnetic media, optical media, magneto-optical media, and electronic media.

12. A method for detecting data corruption resulting from defective operation of a floppy diskette controller, the method comprising:
writing data as data bytes to a storage medium;
identifying a demarcation rule effective to reflect a correspondence of data bytes to the sector size of the storage medium and effective to identify a first byte, a last byte, and a next-to-last byte corresponding to the sector size;
scanning the data bytes in accordance with the demarcation rule; and
detecting erroneous replication of bytes within a segment of data corresponding to the sector size.

13. The method of claim 12, wherein detecting further comprises comparing a value of the last byte, with a value of the next-to-last byte.

14. The method of claim 12, further comprising applying a false positive filter to reduce spurious results.

15. The method of claim 14, further comprising comparing previous identical values in the segment with the value of the last and next-to-last bytes.

16. The method of claim 14, wherein the value of the last and next-to-last bytes is zero.

17. The method of claim 12, wherein the demarcation rule reflects a number of bytes corresponding to a sector of an initial storage medium controlled by the floppy diskette controller.

18. The method of claim 17, wherein the initial storage medium is a magnetic storage medium.

19. The method of claim 18, wherein the magnetic storage medium is a floppy diskette.

20. The method of claim 12, wherein the data in the storage medium is formatted in accordance with a format scheme distinct from a sectoring scheme applied at the time first writing.

21. The method of claim 20, further comprising comparing values corresponding to a last byte and a next-to-last byte in a segment corresponding to the sector size in the sectoring scheme.

22. The method of claim 12, wherein scanning further comprises executing a physical scan of the storage medium, and wherein the storage medium is an original storage medium corresponding to a first writing of the data.

23. The method of claim 22, wherein the storage medium is attached to the floppy diskette controller.

24. The method of claim 23, wherein the magnetic storage medium is a floppy diskette.

25. The method of claim 22 further comprising filtering out false positive results.

26. The method of claim 23, wherein the storage medium is a magnetic storage medium.

* * * * *